United States Patent [19]

Reichert et al.

[11] 4,386,503
[45] Jun. 7, 1983

[54] METHOD AND APPARATUS FOR CONTROLLING AND OPTIONALLY REGULATING THE LEVEL OF LIQUID $P_2S_5$ IN A COOLING DEVICE

[75] Inventors: Günter Reichert, Bornheim-Merten; Franz Mainzer, Hürth; Kurt Lehmann; Hermann Niermann, both of Erfstadt, all of Fed. Rep. of Germany

[73] Assignee: Hoechst Aktiengesellschaft, Fed. Rep. of Germany

[21] Appl. No.: 235,050

[22] Filed: Feb. 17, 1981

[30] Foreign Application Priority Data

Feb. 22, 1980 [DE] Fed. Rep. of Germany ....... 3006625

[51] Int. Cl.³ .............................................. F25C 1/14
[52] U.S. Cl. ...................................... 62/188; 62/354; 73/302; 264/40.4
[58] Field of Search ........................... 62/188, 71, 354; 73/302; 264/40.4; 425/145

[56] References Cited

U.S. PATENT DOCUMENTS 3,403,526 10/1968 Brindley ................................ 62/188
4,291,575 9/1981 Frissora ................................ 73/302

*Primary Examiner*—William E. Wayner
*Attorney, Agent, or Firm*—Connolly and Hutz

[57] ABSTRACT

The invention relates to a method for controlling and optionally regulating the level of liquid $P_2S_5$ in a cooling device. To this end, an inert gas is introduced into the cooling apparatus arranged in inclined position. More particularly, the inert gas is introduced into the cooling apparatus' lower end portion through an inlet opening thereinto near a $P_2S_5$-feed inlet, and forced to bubble through the liquid $P_2S_5$. The pressure difference which establishes in accordance with the $P_2S_5$ liquid level in the device is measured and variations in the respective pressure difference are utilized for regulating the supply of liquid $P_2S_5$ to the cooling device so as to maintain a predetermined liquid level therein.

2 Claims, 1 Drawing Figure

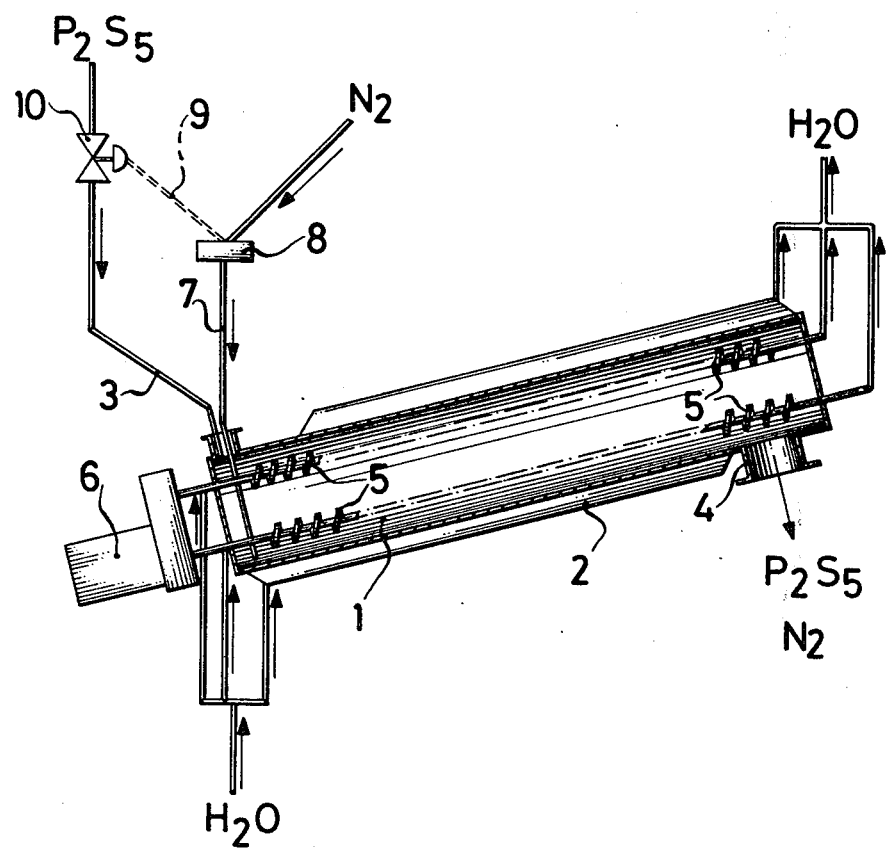

METHOD AND APPARATUS FOR CONTROLLING AND OPTIONALLY REGULATING THE LEVEL OF LIQUID P₂S₅ IN A COOLING DEVICE

The present invention relates to a process permitting the level of liquid $P_2S_5$ inside a cooling device to be controlled and optionally to be regulated, and to an apparatus for carrying out this process.

Phosphorus pentasulfide is commercially used, for example, as a raw material in the production of phosphorus/sulfur-based insecticides, or lubricating oil additives. To this end, the $P_2S_5$ is subjected, in a first step, to reaction with alcohols or phenols in accordance with the following equation:

$$P_2S_5 + 4ROH \rightarrow 2(RO)_2P(S)SH + H_2S$$

Vital to this reaction is the so-called reactivity of $P_2S_5$, i.e. the velocity with which $P_2S_5$ undergoes reaction with the alcohol used. Depending on the process or technical apparatus employed in each particular case, more or less reactive $P_2S_5$ is required to be used therein.

An index of the reactivity of $P_2S_5$ is the increase in temperature which occurs during the reaction of an alcohol with the $P_2S_5$ concerned.

A method customarily employed for determining the reactivity of $P_2S_5$ comprises measuring the maximum temperature increase which occurs during reaction of 36 g of $P_2S_5$ with 100 ml of isopropanol, in a Dewar vessel with agitation. The temperature increase divided by the time required to effect the increase indicates the reactivity in °C./min.

Highly reactive $P_2S_5$ is generally produced by rapidly chilling a thin $P_2S_5$ layer on a cooling roller or similar device, and $P_2S_5$ of low reactivity is produced, e.g. by placing a $P_2S_5$-melt in a cooling coil and gradually cooling it therein.

More particularly, liquid $P_2S_5$ is placed in the lower portion of the trough of a worm or screw conveyor, allowed to solidify therein and crushed to relatively small lump material which is removed from the upper end portion of the worm or screw conveyor (cf. accompanying drawing).

Fairly constant quantities of $P_2S_5$ are required to be fed to the trough so as to ensure reliable functioning of the worm or screw conveyor, and the formation of $P_2S_5$ of regular reactivity. In the event of the trough being overfed, portions of inadequately solidified material which in the end result in crushing mechanisms becoming clogged therewith, are liable to run out from the upper end portion of the worm or screw conveyor. On the other hand, in a trough inadequately filled with $P_2S_5$, the $P_2S_5$ may become cooled too rapidly and undergo undesirable increase in reactivity.

Attempts have therefore been made to control the level of material inside a worm or screw conveyor e.g. by testing the worm or screw drive for its electric energy charging rate. This however is an inaccurate method wherein the values determined for the charging rate at a given level of material in the worm or screw conveyor always differ with the speed selected for the operation of the worm or screw conveyor.

It is generally known in the art that the filling level of a liquid in a container can be tested by causing an inert gas to bubble through the liquid and determining the resulting gas pressure. Every change of the filling level effects a corresponding change of the gas pressure so that it is possible for conclusions relative to the change of the level of liquid in the container to be drawn from the establishing difference in pressure (bubble type level control).

In accordance with our present invention, we have unexpectedly found that this testing method, known as such, can also be used for measuring the level of liquid $P_2S_5$ in a cooling means.

This is a result which would not have been foreseen inasmuch as the melt of 300° to 400° C. is continuously in contact with the cooling surface areas of the worm or screw conveyor and also with the cooling trough so that solidifying $P_2S_5$ would have been expected to blockade the gas inlet tube. This however is not the case and the tube in fact remains free even if cold inert gas is used.

The present invention relates more particularly to a method for controlling and optionally regulating the level of liquid $P_2S_5$ in a cooling device, which comprises: introducing an inert gas into the cooling apparatus being arranged in inclined position, the inert gas being introduced into the cooling apparatus' lower end portion through an inlet opening thereinto near a $P_2S_5$-feed inlet; bubbling th inert gas through the liquid $P_2S_5$, and measuring the pressure difference which establishes in accordance with the $P_2S_5$-liquid level in the apparatus, and optionally utilizing, in known manner, variations in the respective pressure difference for regulating the supply of liquid $P_2S_5$ to the cooling apparatus so as to maintain a predetermined liquid level therein.

The invention also relates to an apparatus for carrying out the present process.

The apparatus is shown diagrammatically in the accompanying drawing and is comprised of a cooling trough 1 in inclined position provided, at its lower end portion, with a cooling jacket 2, a liquid $P_2S_5$-inlet 3 and, at its upper end portion, with a solid $P_2S_5$-outlet 4 and with at least one cooled worm or screw conveyor 5 which is arranged to be driven by a drive 6. Disposed so as to open into the cooling trough 1 is an inert gas inlet 7 which is connected to a pressure-measuring and level-indicating device 8, the inert gas inlet 7 being arranged in the immediate neighborhood of the liquid $P_2S_5$-inlet so as to terminate above the wall of the cooling trough 1 at a level which lies between the axis and the lower edge of the worm or screw conveyor 5.

A preferred feature of the apparatus of this invention provides for the pressure-measuring and level-indicating device 8 to communicate, through a connection 9, with a regulating valve 10 which is installed in the liquid $P_2S_5$-inlet 3 and regulates the admission of $P_2S_5$ in accordance with the level of liquid $P_2S_5$ in the cooling trough 1.

By the use of the measuring device described it is possible very accurately and reproducibly to determine the level of liquid $P_2S_5$ in a cooling trough. Used in combination with a regulating valve accomodated in a material inlet pipe, the present device also permits liquid $P_2S_5$ in the cooling trough to be maintained at a desirably constant level even if supply of material should considerably vary during operation.

EXAMPLE

The cooling trough was about 3050 mm long, about 350 mm wide, provided with 2 worm or screw conveyors about 180 mm in diameter and arranged in inclined position at an angle of 6°. Introduced into the trough's lower end portion was about 400 kg/h liquid $P_2S_5$. The trough was cooled with 8000 l/h cooling water and each of the two worm conveyors with 4000 l/h.

In accordance with this invention, a nitrogen-operated bubbling means was arranged near the lower end portion of the cooling trough. The liquid $P_2S_5$ level was tested by determination of pressure differences and maintained with the aid of a fine-regulation valve within narrow limits, namely within 65 to 75% of the allowable maximum.

The temperature of the solidified material which came from the screw conveyor varied within the narrow limits of 130° to 140° C. The reactivity was 0.8° to 0.9° C./minute.

Without level control, the level of material in the worm or screw conveyor varied within the range 40 to 100%, and partially incompletely solidified material was obtained.

The temperature reached peaks as high as up to 250° C. and the reactivity varied between 0.8° to 1.5° C./minute.

We claim:

1. An apparatus for controlling and optionally regulating the level of liquid $P_2S_5$ in a cooling apparatus comprised of a cooling trough (1) in inclined position provided, at its lower end portion, with a cooling jacket (2), a liquid $P_2S_5$ inlet (3) and, at its upper end portion, with a solid $P_2S_5$ outlet (4) and with at least one cooled screw conveyor (5) driven by means of a drive (6), wherein an inert gas inlet (7) which is connected to a pressure-measuring and level-indicating device (8) is disposed so as to open into the cooling trough (1), the inert gas inlet (7) being positioned in the immediate neighborhood of the liquid $P_2S_5$ inlet (3) so as to terminate above the wall of the cooling trough (1) at a level which lies between the axis and lower edge of the screw conveyor (5).

2. The apparatus as claimed in claim 1, wherein the pressure-measuring and level-indicating device (8) is arranged so as to communicate, through a connection (9), with a regulating valve (19), the latter being installed in the liquid $P_2S_5$ inlet (3) and regulating the admission of $P_2S_5$ in accordance with the level of liquid $P_2S_5$ in the cooling trough (1).

* * * * *